March 7, 1933.  C. E. MAYNARD  1,900,455
AUTOMATIC MOLD CLOSING APPARATUS
Filed Oct. 12, 1931  3 Sheets-Sheet 1

INVENTOR.
CHARLES EDGAR MAYNARD
BY
Chapin & Neal
ATTORNEY.

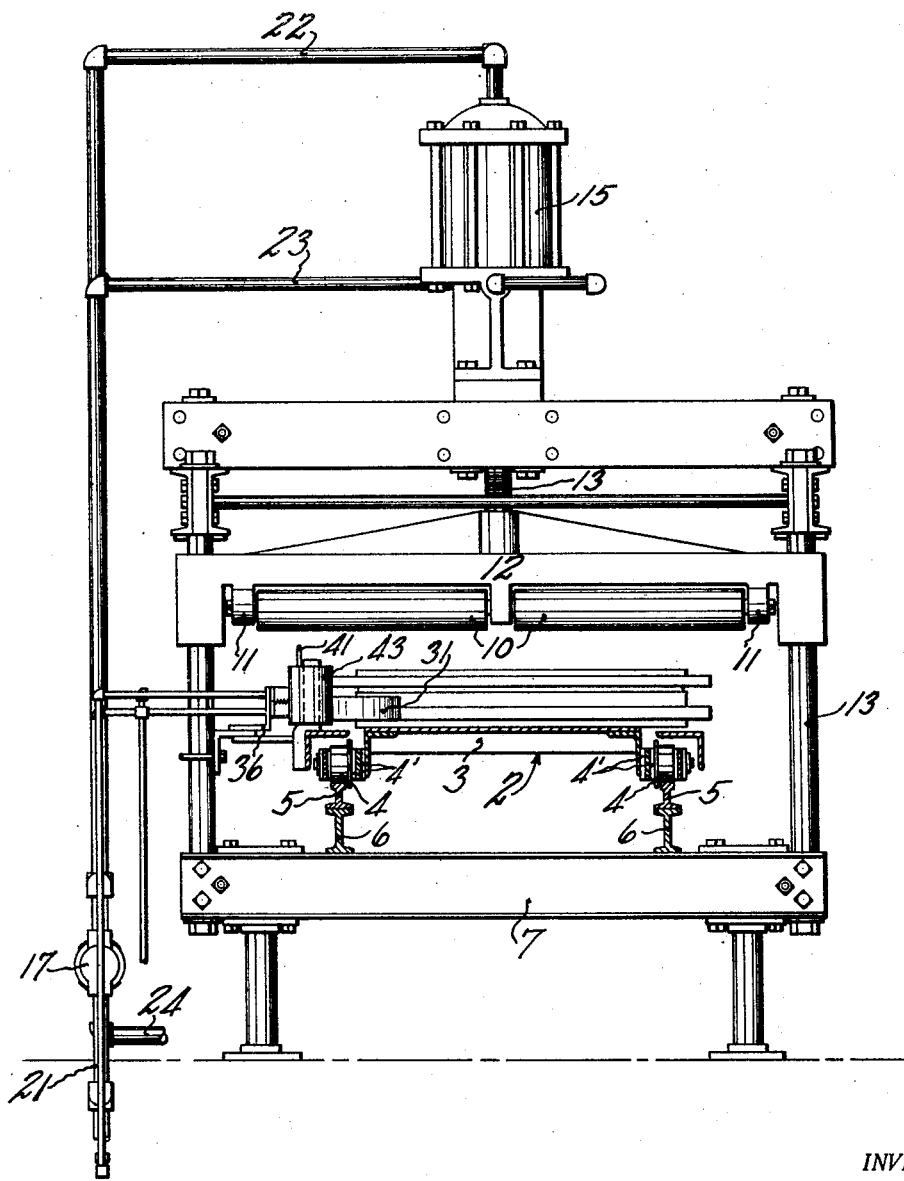

March 7, 1933. C. E. MAYNARD 1,900,455
AUTOMATIC MOLD CLOSING APPARATUS
Filed Oct. 12, 1931 3 Sheets-Sheet 3
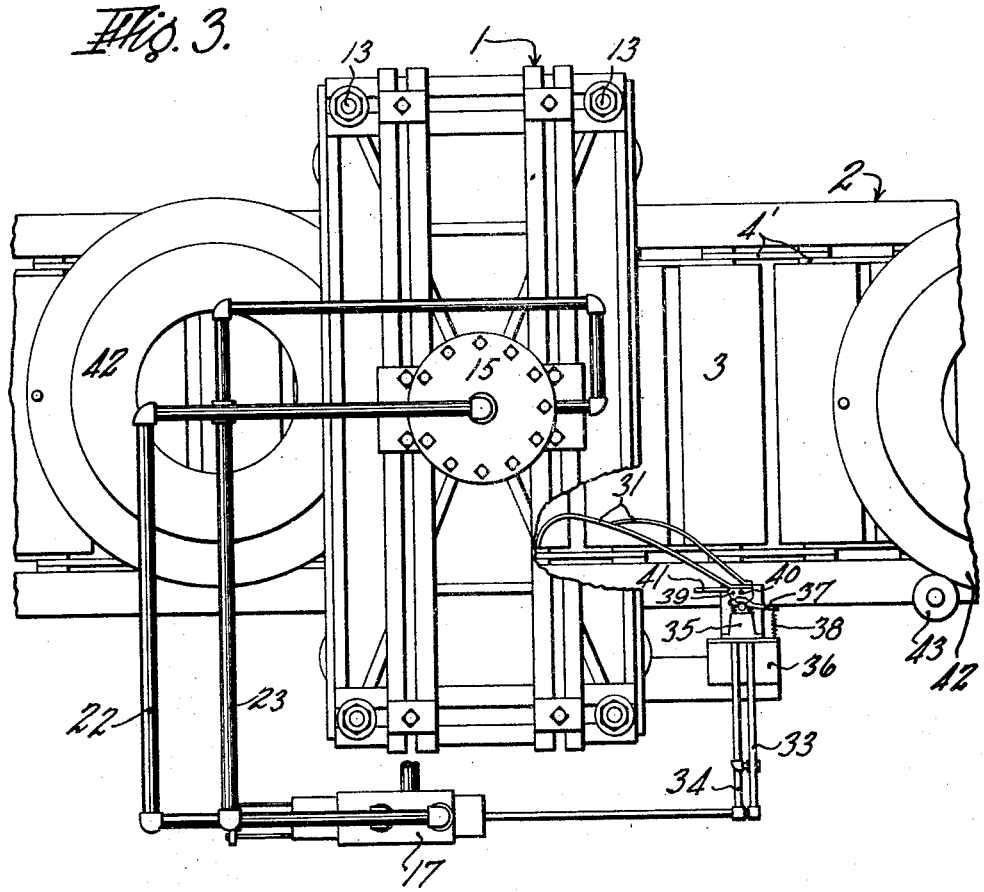
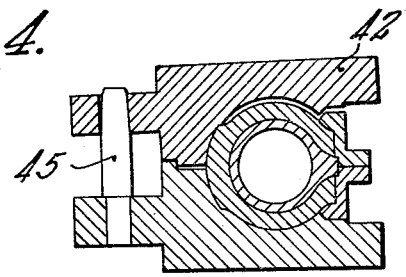
INVENTOR.
CHARLES EDGAR MAYNARD
BY
Chapin & Neal
ATTORNEY.

Patented Mar. 7, 1933

1,900,455

UNITED STATES PATENT OFFICE

CHARLES EDGAR MAYNARD, OF NORTHAMPTON, MASSACHUSETTS, ASSIGNOR TO ROLAND W. BOYDEN AND CHARLES A. DANA, AS RECEIVERS OF THE FISK RUBBER COMPANY, OF CHICOPEE FALLS, MASSACHUSETTS, A CORPORATION OF MASSACHUSETTS

AUTOMATIC MOLD CLOSING APPARATUS

Application filed October 12, 1931. Serial No. 568,362.

This invention relates to means for pressing the upper and lower halves of pneumatic tire molds into closed relation as the mold is advanced by a mold conveyor. In devices now in use for this purpose the molds are commonly removed from the conveyor, either onto a stationary table or an auxiliary conveyor and centered beneath a platen which is moved downwardly to press the mold members into closed relation. It is one object of the present invention to provide mold closing apparatus which will operate on the molds while on the conveyor which transports them to the heaters and in a more efficient manner than prior devices of this character. A further object is to provide a device which will automatically operate on each mold of a series uniformly, regardless of the spacing or size of the mold. Other and further objects will be apparent from the following specification and claims.

In the accompanying drawings which illustrate one embodiment of my invention,

Fig. 2 is a view looking from the right of Fig. 1;

Fig. 3 is a plan view of the structure shown in Fig. 1; and

Fig. 4 is a detail sectional view showing the relative position of the mold members as acted on by the press members in the initial operation of the apparatus.

Figure 1:
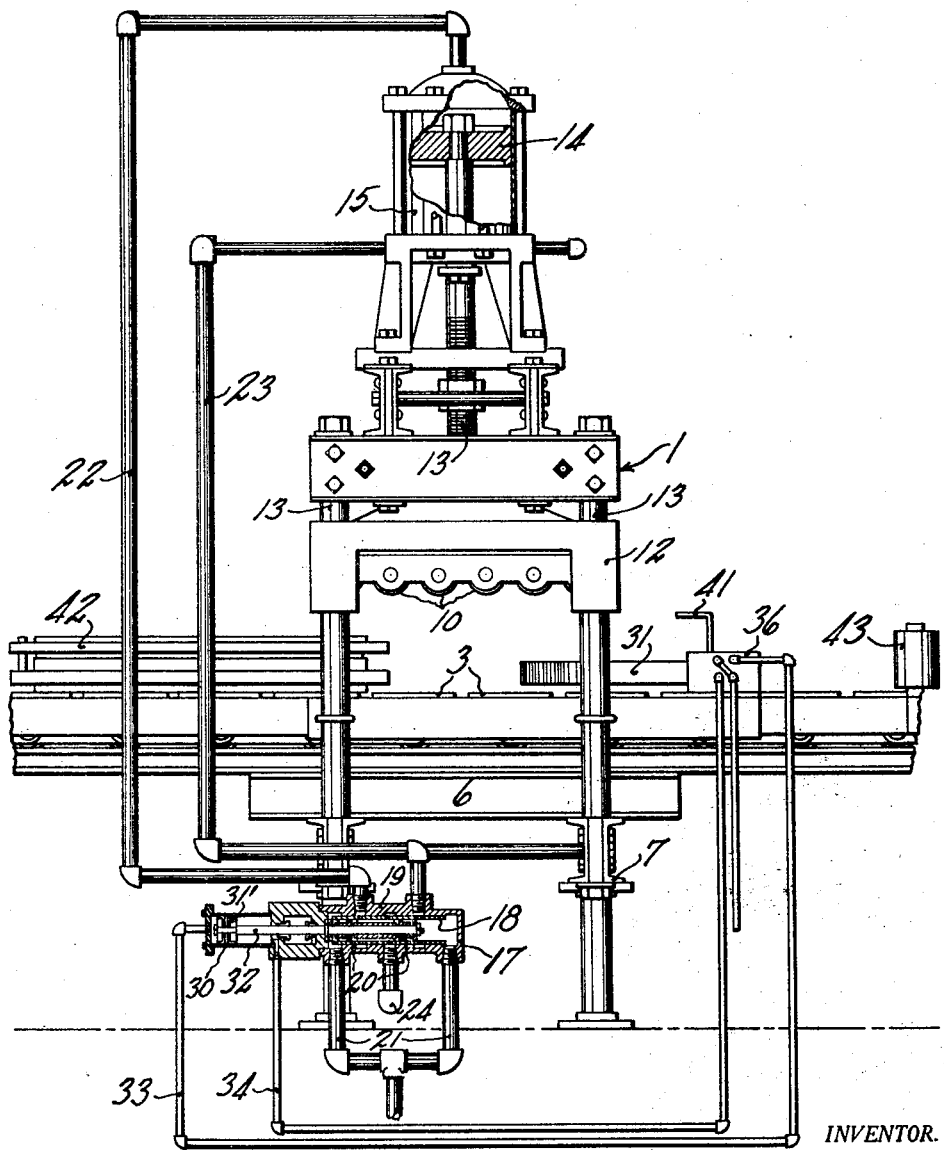
Fig. 1 is a side elevation of the device shown in operative relation with a mold conveyor.

Referring to the drawings, the frame of the apparatus, generally indicated at 1, is positioned to bridge the mold conveyor 2, which is normally continuously driven, to carry the filled molds to the heaters. The conveyor 2 comprises a series of inverted channel members 3 provided with flanged rollers 4 running on tracks 5. Adjacent members 3 are joined by links 4 forming the members 3 into a continuous conveyor chain. Members 3 act as the lower platen of the mold closing press and tracks 5 are preferably locally reenforced by longitudinal beams 6 and cross beams 7 forming part of the frame 1. The upper platen of the press comprises a plurality of rollers 10 positioned transversely of the conveyor and freely journaled in bearings 11 carried on the underside of platen member 12 reciprocably mounted on and guided by vertical posts 13 forming part of the frame 1. Platen member 12 is secured to the free end of a piston rod 13 which is provided with a piston 14 operating in a double acting hydraulic cylinder 15 mounted on the frame 1. Water pressure is supplied to cylinder 15 through a valve 17 best shown in Fig. 1. The valve 17 comprises a cylinder 18 in which operates a piston 19 having two spaced heads 20. The ends of the cylinder 18 are connected by pipes 21 to a source of hydraulic pressure not shown. Pipe 22 connects one end of cylinder 18 to the top of cylinder 15 and pipe 23 connects the other end of cylinder 18 to the bottom of cylinder 15. A return pipe 24 is connected to the center of cylinder 18 intermediate the heads of piston 20. In the position shown in Fig. 1 the hydraulic pressure is being supplied through pipes 21 and 22 to the top of cylinder 15 to drive piston 14 and the attached platen downwardly while the bottom of cylinder 15 is connected through pipe 23 and the space between heads 20 to the return pipe 24. As will be obvious when the piston 19 is moved to the opposite end of cylinder 18, pipe 23 will be connected to the pressure side 21 while pipe 22 will be connected to the return 24, thus raising piston 14 and platen member 12.

The piston 19 is controlled by an air cylinder 30 in which piston 31' is secured to piston rod 32 to which piston 19 is also secured. Air is supplied to opposite sides of piston 31' through pipes 33 and 34 connected to a four-way valve 35, which may be of any standard or conventional design, mounted adjacent the conveyor 2 on a bracket 36 secured to frame 1. The actuating plate 37 of valve 35 is normally held by spring 38 in position to hold the platen member 12 in raised position. Plate 37 is adapted to be rocked to reverse the pressure in cylinder 15 and lower the platen member by an actuator 39 pivoted at 40 to bracket 36 and provided with an extension 31 positioned to be engaged by the molds as they are advanced under the platen member 12. In order to facilitate removal of actuator 39 handle 41 is provided by which it may be raised from the pivot pin 40.

In order to insure that the molds, indicated at 42, properly engage the actuator regardless of the size of the mold a vertical roll 43 is mounted adjacent the conveyor and in position to engage the molds just prior to their contact with the actuator and slides them transversely into proper alignment with the actuator.

The opening of valve 35 by the actuator 39 is so timed with the speed of the conveyor and the operation of cylinders 18 and 15 that the rolls 10 of platen member 12 initially engage the molds when they are partly under the press, the mold being progressively closed as the mold is carried beneath the descending platen by the conveyor. I have found that less hydraulic pressure is required to properly close the mold when the mold is thus closed progressively than when the mold is completely under the press when the platen is lowered. Furthermore, the mold halves more easily accommodate themselves to the centering dowels 45 (see Fig. 4) where the dowel at one edge is first engaged, permitting it to automatically adjust the halves to the other dowels.

Should it be desirable to pass a series of empty molds through the press the actuator 39 may be removed from its pin. The actuator may also be temporarily removed to permit molds to be slid backwardly along the conveyor as may sometimes be necessary when a mold passes through the press improperly registered.

It will be seen that in the operation of my device the molds are not removed from the conveyor and that regardless of size or spacing are closed uniformly and progressively.

Having thus described my invention, I claim:

1. A device for closing molds which comprises, a continuously moving flat surfaced mold conveyor forming one member of a press, a vertically reciprocable platen positioned over the conveyor and forming the other member of the press, means to move the platen into mold closing contact with a mold on the conveyor, and actuating means positioned to be engaged by the mold, as the latter is advanced by the conveyor, to actuate the platen moving means, said actuating means and said platen moving means being so timed with respect to the speed of the conveyor that the forward edge of the advancing mold is first engaged by the platen, whereby the mold is progressively closed as it is carried beneath the platen by the conveyor.

2. A device for closing molds which comprises, a continuously moving flat surfaced mold conveyor forming one member of a press, a vertically reciprocable platen positioned over the conveyor and forming the other member of the press, means to move the platen into mold closing contact with a mold on the conveyor, and an actuating member removably mounted adjacent the conveyor and normally positioned to be engaged by the mold, as the latter is advanced by the conveyor, to actuate the platen moving means, said actuating member and said platen moving means being so timed with respect to the speed of the conveyor that the forward edge of the advancing mold is first engaged by the platen, whereby the mold is progressively closed as it is carried beneath the platen by the conveyor.

3. A device for closing molds which comprises, a continuously moving flat surfaced mold conveyor forming one member of a press, a vertically reciprocable platen positioned over the conveyor and forming the other member of the press, means to move the platen into mold closing contact with a mold on the conveyor, an actuating member removably mounted adjacent the conveyor and normally positioned to be engaged by the mold, as the latter is advanced by the conveyor, to actuate the platen moving means, and means to position the mold on the conveyor in predetermined relation to the actuating member irrespective of the size of the mold, said actuating member and said platen moving means being so timed with respect to the speed of the conveyor that the forward edge of the advancing mold is first engaged by the platen, whereby the mold is progressively closed as it is carried beneath the platen by the conveyor.

4. A device for closing molds which comprises, a continuously moving flat surfaced mold conveyor forming one member of a press, a vertically reciprocable platen positioned over the conveyor and forming the other member of the press, an hydraulic cylinder for moving the platen into mold closing contact with a mold on the conveyor, an air operated valve controlling the operation of said cylinder, a second valve controlling the operation of the first named valve, an actuating member for the second valve positioned to be engaged by the mold as the latter is advanced by the conveyor, said actuating member, said valves and said cylinder being so timed with respect to the speed of the conveyor that the forward edge of the advancing mold is first engaged by the platen, whereby the mold is progressively closed as it is carried beneath the platen by the conveyor.

5. A device for closing molds which comprises, a continuously moving flat surfaced mold conveyor forming one member of a press, a vertically reciprocable platen positioned over the conveyor and forming the other member of the press, means to move the platen to and from mold closing position, and means responsive to the presence of a mold on the conveyor in a predetermined relation to the platen to actuate the platen moving means.

6. A device for closing molds which comprises, a continuously moving flat surfaced mold conveyor forming one member of a press, a vertically reciprocable platen positioned over the conveyor and forming the other member of the press, means to move the platen to and from mold closing position, and means responsive to the presence of a mold on the conveyor in a predetermined relation to the platen to actuate the platen moving means, said actuating means being adapted to be rendered inoperative at the will of the operator.

In testimony whereof I have affixed my signature.

CHARLES EDGAR MAYNARD.